United States Patent
Marron

(10) Patent No.: US 6,741,361 B2
(45) Date of Patent: May 25, 2004

(54) MULTI-STAGE DATA PROCESSING FOR FREQUENCY-SCANNING INTERFEROMETER

(75) Inventor: Joseph C. Marron, Ann Arbor, MI (US)

(73) Assignee: LightGage, Inc., Bloomfield, NY (US)

( * ) Notice: Subject to any disclaimer, the term of this patent is extended or adjusted under 35 U.S.C. 154(b) by 0 days.

(21) Appl. No.: 10/601,802

(22) Filed: Jun. 23, 2003

(65) Prior Publication Data

US 2004/0066520 A1 Apr. 8, 2004

Related U.S. Application Data

(60) Provisional application No. 60/391,004, filed on Jun. 24, 2002.

(51) Int. Cl.⁷ .................................................. G01B 9/02
(52) U.S. Cl. ........................................................ 356/512
(58) Field of Search ................................ 356/512, 513, 356/514, 489, 495, 450, 451

(56) References Cited

U.S. PATENT DOCUMENTS

| | | | |
|---|---|---|---|
| 4,832,489 A | 5/1989 | Wyant et al. | 356/359 |
| 5,319,668 A | 6/1994 | Luecke | 372/107 |
| 5,627,363 A | 5/1997 | Paxman et al. | 350/208.1 |
| 5,777,742 A | 7/1998 | Marron | 356/359 |
| 5,802,085 A | 9/1998 | Lefevre et al. | 372/20 |
| 5,867,512 A | 2/1999 | Sacher | 372/20 |
| 5,880,841 A | 3/1999 | Marron et al. | 356/360 |
| 5,907,404 A | 5/1999 | Marron et al. | 356/360 |
| 5,909,282 A | 6/1999 | Kulawiec | 356/355 |
| 5,926,277 A | 7/1999 | Marron et al. | 356/360 |
| 6,018,535 A | 1/2000 | Maeda | 372/20 |
| 6,026,100 A | 2/2000 | Maeda | 372/20 |
| 6,359,692 B1 | 3/2002 | Groot | 356/512 |
| 2002/0110985 A1 | 8/2002 | Deck | 356/512 |

OTHER PUBLICATIONS

"Multiple–wavelength Interferometry With Tunable Source", R.G. Pilston and G.N. Steinberg, Applied Optics, vol. 8, No. 3, Mar. 1969, pp. 552–556.

"Two–wavelength Interferometry", D. Malarcara, editor, Optical Shop Testing, New York, Wiley, 1978, pp. 397–402.

"Multiple–wavelength Phase–shifting Interferometry", Y. Cheng and J.C. Wyant, Applied Optics, vol. 24, No. 6, Mar. 15, 1985, pp. 804–806.

"Distance measurement by the wavelength shift of laser diode light", H. Kikuta, K. Iwata, and R. Nagata, Applied Optics, vol. 25, No. 17, Sep. 1, 1986, pp. 2976–2980.

"Interferometer for measuring displacement and distance", T. Kubota, M. Nara, and T. Yoshino, Optics Letters, vol. 12, No. 5, May 1987, pp. 310–312.

(List continued on next page.)

Primary Examiner—Samuel A. Turner
(74) Attorney, Agent, or Firm—Brian B. Shaw, Esq.; Thomas B. Ryan; Harter, Secrest & Emery LLP

(57) ABSTRACT

A system of frequency-scanning interferometry uses a computer system operating in accordance with a program for measuring distances or range, including measuring topographical information about test object surfaces. Interferometric data is detected using a single point detector or an array of such detectors and recorded (stored) in the computer system, and a series of measurements are taken over a range of illumination frequencies. The interferometric data varies in a sinusoidal manner with a change in illumination frequency at interference frequencies corresponding to particular measures of distance or range. A Fourier transform for locating peak interference frequencies is first limited in frequency space and second divided into stages to save processing time. A coarse spacing between Fourier frequency samples is used for a first approximation, and finer spacing between Fourier frequency samples are used in the vicinity of the first approximation to make a second more accurate approximation.

35 Claims, 5 Drawing Sheets

OTHER PUBLICATIONS

"Three–color laser–diode interferometer", P. de Groot, Applied Optics, vol. 30, No. 25, Sep. 1, 1991, pp. 3612–3616.

"Wavelength–shift interferometry for distance measurements using the Fourier transform technique for fringe analysis", M. Suematsu and M. Takeda, Applied Optics, vol. 30, No. 28, Oct. 1, 1991, pp. 4046–4055.

"Three–dimensional lensless imaging using laser frequency diversity", J.C. Marron and K.S. Schroeder, Applied Optics, vol. 31, No. 2, Jan. 10, 1992, pp. 255–262.

"Holographic laser radar", J.C. Maron and K.S. Schroeder, Optics Leters, vol. 18, No. 5, Mar. 1, 1993, pp. 385–387.

"Use of a opacity constraint in three–dimensional imaging", R.G. Paxman, J. H. Seldin, J.R. Fienup, and J.C, Marron, in proceedings of the SPIE Coference on Inverse Optics III, Orlando, Florida, Apr. 1994.

"Applications of Tunable Lasers to Laser Radar and 3D Imaging", L.G. Shirley and G.R. Hallerman, Technical Report 1025, Lincoln Laboratory, MIT, Lexington, Massachusetts, Feb. 26, 1996.

"Wavelength scanning profilometry for real–time surface shape measurement", S. Kuwamura and I. Yamaguchi, Applied Optics, vol. 36, No. 36, No. 19, Jul. 1, 1997, pp. 4473–4482.

"Three–dimensional imaging using a tunable laser source", J.C. Marron and K.W. Gleichman, Optical Engineering 39(1) 47–51, Jan. 2000, pp. 47–51.

"Spectrally narrow pulsed dye laser without beam expander", M.G. Littman and H.J. Metcalf, Applied Optics. vol. 17, No. 14, Jul. 15, 1978, pp. 2224–2227.

"A simple extended–cavity diode laser", A.S. Arnold, J.S. Wilson, and M.G, Boshier, Review of Scientific Instruments, vol. 69, No. 3, Mar. 1998, pp. 1236–1239.

"External–cavity diode laser using a grazing–incidence diffraction grating", K.C. Harvey and C.J, Myatt, Optics letters, vol. 16, No. 12, Jun. 15, 1991, pp. 910–912.

"Novel geometry for single–mode scanning of tunable lasers", K Liu and M.G. Littman, Optics Letters, vol. 6, No. 3, Mar. 1981, pp. 117–118.

"External–cavity frequency–stabilization of visible and infrared semiconductor lasers for high resolution spectroscopy", M.G. Boshier, D. Berkeland, E.A. Hinds, and V. Sandoghar, Optics Communications 85, Sep. 15, 1991, pp. 355–359.

"Widely Tunable External Cavity Diode Lasers", T. Day, M. Brownell, and I–Fan Wu, New Focus, Inc., 1275 Reamwood Avenue, Sunnydale, California.

"Littrow configuration tunable external cavity diode laser with fixed direction output beam", C.J. Hawthorn, K.P. Weber and R.E. Scholten, Review of Scientific Instruments, vol. 72, No. 12, Dec. 2001, pp. 4477–4479.

"Fizeau Interferometer", D. Malarcara, editor, *Optical Shop Testing*, New York, Wiley, 1978, pp. 19–24.

"Burch's Interferometer Employing Two Matched Scatter Plates", D. Malarcara, editor, *Optical Shop Testing*, New York, Wiley, 1978, pp. 82–84.

"Holographic contouring by using tunable lasers", N. George and W. Li, Optics Letters, vol. 19, No. 22, Nov. 12, 1994, pp. 1879–1881.

"Use of a multimode short–external–cavity laser diode for absolute–distance intererometry", P. de Groot, Applied Optics, vol. 32, No. 22, Aug. 1, 1993, pp. 4193–4198.

"Three–dimensional sensing of rough surfaces by coherence radar", T. Dresel, G. Hausler, and H. Venzke, Applied Optics, vol. 31, No. 7, Mar. 1, 1992, pp. 919–925.

Littrow–Laser web site sacher.de/ittrow.htm, Apr. 7, 2002.

"Tunable Diode Lasers—Stand up to Research and Commercial Applications", B. Shine, Laser Product Line Manager, New Focus, Inc., originally published in Photonics Spectra, Jan. 1992, pp. 102.

"Scatter Fringes of Equal Thickness", J. M. Burch, Nature, vol. 17, May 16, 1953, pp. 889–890.

"Scatter–Fringe Inteferometry", J. M. Burch, J. Opt. Soc. Am. 52, 1962, pp. 600.

"Some Further Aspects of Scater–Fringe Interferometry", A.H. Shoemaker, and M.V.R.K. Murty, Applied Optics, vol. 5, No. 4, Apr. 1966, pp. 603–607.

"Laser Speckle and Related Phenomena", J.C. Dainty, editor, Springer–Verlag, Berlin, 1984.

"Digital Picture Processing", A. Rosenfeld, and A.C. Kak, vol. 1, Academic Press, New York, 1982.

MULTI-STAGE DATA PROCESSING FOR FREQUENCY-SCANNING INTERFEROMETER

RELATED APPLICATIONS

This application claims the benefit of prior filed U.S. Provisional Application No. 60/391,004, filed 24 Jun. 2002, which is hereby incorporated by reference.

TECHNICAL FIELD

The processing of data gathered by frequency-scanning interferometers involves converting rates of interferometric variation accompanying variations in beam frequency into such length measures as surface topography or distance.

BACKGROUND

Frequency-scanning interferometers, also referred to as wavelength-scanning interferometers or multi-wavelength interferometers, derive from measures of interference taken at a succession of different beam frequencies (or wavelengths) path length differences between interfering object and reference beams. In contrast to conventional interferometers that compare path length differences between points within the same interference patterns and use additional interference patterns to resolve ambiguities of the intra-pattern comparisons, frequency-scanning interferometers resolve points within interference patterns individually, based upon interferometric (e.g., intensity or phase) fluctuations of corresponding points within different interference patterns produced at different beam frequencies.

As such, a wider range of surface roughness and distances can be unambiguously measured by frequency-scanning interferometers. Conventional interferometers are typically limited to measuring step sizes in the direction of illumination within the fringe spacing of their interference patterns, which correspond to the wavelength of the illumination. The measurement of such step sizes by frequency-scanning interferometers is independent of the nominal wavelength of illumination, depending instead on the average interval between the beam frequencies. The finer the interval, the larger the range of unambiguous measurement. Thus, frequency-scanning interferometers can provide measures of rough or diffuse surfaces at beam frequencies that produce speckle-ridden interference patterns unintelligible to conventional interferometers.

Frequency-scanning interferometers are especially useful for measuring surface profiles of test objects as measures of surface variations taken normal to a reference plane or surface. Recent developments of frequency-scanning interferometry include the use of components such as tunable diode lasers and CCD detector arrays. As a result, compact, accurate, and fast systems have been developed, which have the capability of performing measurements for both imaging and non-imaging applications.

A known type of frequency-scanning interferometer system 10 is depicted in FIG. 1. While in the overall form of a Twyman-Green interferometer, a tunable laser 12 under the control of a computer 14 produces a measuring beam 16 that can be tuned through a range of different frequencies. Beam conditioning optics 18 expand and collimate the measuring beam 16. A folding mirror 20 directs the measuring beam 16 to a beamsplitter 22 that divides the measuring beam 16 into a object beam 24 and a reference beam 26. The object beam 24 retroreflects from a test object 30, and the reference beam 26 retroreflects from a reference mirror 32. The beamsplitter 22 recombines the object beam 24 and the reference beam 26, and imaging optics 34 (such as a lens or group of lenses) focus overlapping images of the test object 30 and the reference mirror 32 onto a detector array 36 (such as a CCD array of elements). The detector array 36 records the interferometric values of an interference pattern produced by path length variations between the object and reference beams. 24 and 26. Outputs from the detector array 36 are stored and processed in the computer 14.

The elements of the detector array 36 record local interferometric values subject to the interference between the object and reference beams 24 and 26. Each of the interferometric values is traceable to a spot on the test object 30. However, instead of comparing interferometric values between the array elements to determine phase differences between the object and reference beams 24 and 26 throughout an interference pattern as a primary measure of surface variation, a set of additional interference patterns is recorded for a series of different beam frequencies (or wavelengths) of the measuring beam 16. The tunable laser 12 is stepped through a succession of incrementally varying beam frequencies, and the detector array 36 records the corresponding interference patterns. Data frames recording individual interference patterns numbering 16 or 32 frames are typical.

The local interferometric values vary in a sinusoidal manner with changes in beam frequency, cycling between conditions of constructive and destructive interference. The rate of interferometric variation, e.g., the frequency of intensity variation, is a function of the path length differences between the local portions of the object and reference beams 24 and 26. Gradual changes in intensity (lower interference frequency variation) occur at small path length differences, and more rapid changes in intensity (higher interference frequency variation) occur at large path length differences.

Discrete Fourier transforms can be used within the computer 14 to identify the interference frequencies of interferometric (e.g., intensity) variation accompanying the incremental changes in the beam frequency of the measuring beam 16. The computer 14 also converts the interference frequencies of interferometric variation into measures of local path length differences between the object and reference beams 24 and 26, which can be used to construct a three-dimensional image of the test object 30 as measures of profile variations from a surface of the reference mirror 32. Since the reference mirror 32 is planar, the determined optical path differences are equivalent to deviations of the object 30 from a plane. The resulting three-dimensional topographical information can be further processed to measure important characteristics of the object 30 (e.g. flatness or parallelism), which are useful for quality control of precision manufactured parts.

Considerable computational time is required for computing the Fourier transforms for each of a number of points sampled from the interference patterns. For example, intensity detector arrays having a matrix of one thousand by one thousand detector elements require up to one million Fourier transforms to be performed. The computing time for each Fourier transform increases with both the number of different interference patterns recorded and the number of Fourier frequency samples tested. The range of detectable interference frequencies is dependent upon the number of recorded interference patterns, and the accuracy with which the interference frequencies can be identified depends upon the number of Fourier frequency samples used. Accordingly, computing time, which is affected by multiple dimensions, can slow measurement procedures, rendering the measurement procedures too slow for "real time" or "inline" inspections.

SUMMARY OF INVENTION

Significant reductions in computational time are made for processing interferometric data produced by frequency-scanning interferometers. Improvements are made to both simplify and streamline processing. Faster measurements and measurements with higher accuracy are possible.

One object of the invention is to provide an improved frequency-scanning interferometry system for distance or range measurement, including such systems that produce 3-D images of the surface profile of a test object, wherein computations of distance or range values are carried out with speed and accuracy. A more general object of the invention is to provide an improved system for deriving distance or range measurements from interferometric data.

The invention can be practiced as a multi-stage process for interpreting interferometric fluctuations of frequency-scanning interferometers. A succession of N interference patterns are produced between object and reference beams at N different beam frequencies within a range of beam frequencies. Interferometric data is recorded for a corresponding area appearing in each of the N interference patterns. The interferometric data for the corresponding area cycles through conditions of constructive and destructive interference with variation in the beam frequencies. A first approximation is made of an interference frequency corresponding to the number of interference cycles the interferometric data for the corresponding area undergoes throughout the range of beam frequencies. The bounds of this first approximation are determined. A second approximation is made of the interference frequency within the bounds of the first approximation of the interference frequency. The second or higher approximation of the interference frequency is then converted into a measure corresponding to a path length difference between portions of the object and reference beams that interfere within the corresponding area of the interference patterns.

The first approximation preferably approximates the interference frequency from among the number N or less choices of interference frequency. In particular, the first approximation preferably approximates the interference frequency from among approximately N/2 choices of interference frequency. As such, the choices of interference frequency within the first approximation are distinguished by approximately whole cycles of constructive and destructive interference within the range of beam frequencies. The choices of interference frequency within the second approximation are distinguished by significantly less than whole cycles of constructive and destructive interference within the range of beam frequencies.

Preferably, the first approximation approximates the interference frequency from among a first range of interference frequencies separated by a first increment, the second approximation approximates the interference frequency from among a second range of interference frequencies separated by a second increment, and the second range of frequencies is approximately equal to the first increment separating interference frequencies within the first range.

Also preferably, the first approximation approximates the interference frequency from among $M_1$ choices of interference frequency, and the second approximation approximates the interference frequency from among $M_2$ choices of interference frequency. The second approximation is substantially equivalent in accuracy to single approximation that approximates the interference frequency from among the product of $M_1$ times $M_2$ choices of interference frequency.

For at least one of the first and second approximations, the number N of beam frequencies is preferably equal to a number $M_s$ of interference frequency choices. The range of beam frequencies can be used to determine a lower bound of effectively measurable path length differences between the object and reference beams, and an average increment between adjacent beam frequencies can be used to determine a range of unambiguous path length differences. The lower bound of path length differences between object and reference beams within the unambiguous range is associated with an interference frequency of unity or less cycles of constructive and destructive interference within the range of beam frequencies. The upper bound of path length differences within the unambiguous range is associated with an interference frequency of N/2 cycles of constructive and destructive interference within the range of beam frequencies.

For measuring surface topographies, interferometric data is recorded for a plurality of corresponding areas appearing in each of the N interference patterns. The interferometric data for each of the corresponding areas cycles through conditions of constructive and destructive interference with the variation in the beam frequencies. A plurality of first approximations of interference frequencies are made corresponding to the number of interference cycles the interferometric data for the corresponding areas undergo throughout the range of beam frequencies. The individual bounds of the first approximations are determined. A plurality of second approximations of the interference frequencies are made within the individual bounds of the first approximations of the interference frequency. The second or higher approximations of the interference frequencies are then converted into measures corresponding to a path length difference between different portions of the object and reference beams that interfere within the corresponding areas of the interference patterns. The interference patterns can be recorded as overlapping images of a test object surface and a reference element surface for relating the path length differences to surface height variations at corresponding locations on the test object surface.

Finer or additional measuring stage measurements can be made by performing a third approximation of the interference frequency within the bounds of the second approximation of the interference frequency. The third or a higher approximation of the interference frequency is converted into a measure corresponding to a path length difference between portions of the object and reference beams that interfere within the corresponding area of the interference patterns.

The second or higher approximation of the interference frequency can include identifying two close approximations of the interference frequency and interpolating a closer approximation of the interference frequency from the two close approximations of the interference frequency. For example, the closer approximation can be identified at a location where a first derivative of an implied sinusoidal function has a zero value.

The invention can also be practiced as a system for deriving length information from interferometric data collected over a range of different frequencies. A frequency-scanning interferometer produces a series of interference patterns between object and reference beams over the range of different frequencies. A common location within the interference patterns discretely cycles over the range of different frequencies through conditions of constructive and destructive interference at a rate corresponding to an interference frequency. A data acquisition system acquires data samples from the common location within the series of interference patterns. A processor evaluates a first set of interference frequency samples against the data samples to obtain a first approximation of the interference frequency that matches the cycle rate of the data samples and evaluates a second set of interference frequency samples in the vicinity of the first approximation of the interference frequency against the data samples to better approximate the interference frequency that matches the cycle rate of the data samples. In addition, the processor relates the better approximated interference frequency to length differences between the object and reference beams.

The first set of interference frequency samples are preferably frequency components of a Fourier transform that are compared to determine a peak interference frequency. The Fourier frequency components of the first set of interference frequency samples are spaced apart at a first increment, and the Fourier frequency components of the second set of interference frequency samples are spaced apart at a second increment that is finer than the first increment. The Fourier frequency components of the second set of interference frequency samples encompass a frequency range approximately equal to the first increment at which the first set of interference frequency samples are spaced apart.

Preferably, the first increment is no larger than a unit interference frequency. For example, the first increment can be equal to one-half of a unit interference frequency. The processor preferably correlates at least one of the sets of the interference frequency samples with the data samples by a Fourier transform that identifies the interference frequency sample of the set that best matches the cycle rate of the data samples. Both sets of the interference frequency samples are correlated with the data samples by the Fourier transform, which identifies the interference frequency sample of each set that best matches the cycle rate of the data samples.

A plurality of common locations in the interference patterns can be evaluated for measuring surface topographies or other multi-point measurements. The data acquisition system acquires individual groups of data samples from the plurality of common locations within the series of interference patterns. The processor separately evaluates the first set of samples of the interference frequency against the individual groups of data samples to obtain first approximations of the interference frequencies that match the cycle rates of the individual groups of data samples. The processor then separately evaluates second sets of samples of the interference frequency in the vicinity of the first approximations of the interference frequency against the individual groups of data samples to better approximate the interference frequencies that match the cycle rates of the individual groups of data samples.

The same first set of samples of the interference frequency can be evaluated against the groups of data samples. However, different second sets of samples of the interference frequency are evaluated against the groups of data samples in accordance with differences between the first approximations of the interference frequency associated with the different groups of data samples. The processor relates the better approximated interference frequencies to range information between the object and reference beams for deriving topographical information about a test surface or other multiple-point information.

A third set of samples of the interference frequency can be evaluated in the vicinity of the second approximation of the interference frequency against the data samples to even better approximate the interference frequency that matches the cycle rate of the data samples. The data samples and interference frequency samples of any one of the sets are preferably arranged to optimize a fast Fourier transform.

The invention can also be practiced as a method of reducing calculations of a frequency transform for converting interferometric data into length differences between object and reference beams. The interferometric data is acquired from a plurality of interference patterns produced by the object and reference beams and distinguished by frequencies of the beams. A succession of N interference data points are extracted from corresponding portions of the interference patterns. The succession of data points cycle through conditions of constructive and destructive interference at an interference frequency related to the path length differences between the test and reference beams. A Fourier transform is constructed of the type used for evaluating frequency contributions of M Fourier samples distributed throughout Fourier frequency space to the N data points collected from the interference patterns. The Fourier transform is limited to the evaluation of less than M Fourier frequency samples similarly distributed throughout a limited portion of the Fourier frequency space. An approximation of the interference frequency is identified from among the less than M Fourier frequency samples as a measure of the path length difference between the test and reference beams.

Preferably, the Fourier transform is limited to the evaluation of no more than M/2 Fourier frequency samples similarly distributed throughout the no more than one-half of the Fourier frequency space, and the approximation of the interference frequency is identified from among the no more than M/2 Fourier frequency samples. Prior to performing the Fourier transform, a mean intensity of the data points is calculated and the calculated mean is subtracted from the data points. The operation removes an intensity bias, leaving the intensity values of the data points as a better fit for an unbiased sinusoidal curve.

For performing a multi-stage measurement, a first approximation of the interference frequency is identified from among the Fourier frequency samples limited to no more than N Fourier frequency samples and more preferably to N/2 samples. A second approximation of the interference frequency is identified from among new Fourier samples that further divide the Fourier frequency space in the vicinity of the first approximation of the interference frequency. The Fourier frequency space considered for the second approximation is preferably equal to the Fourier frequency space between the Fourier frequency samples of the first approximation. The number of such frequency samples is preferably equal to 2M/N samples.

Briefly described, the preferred embodiments of the invention provide a wavelength scanning interferometry system having means for deriving a plurality of samples of interferometric data, as for example with a system of the type shown in FIG. 1, wherein the computation of range value for the interferometric data is carried by a computer system operating in accordance with a program (software or process) for fast and accurate computation of the range value. This program provides accuracy by using a large number of Fourier samples and achieves speed by performing a systematic search for the peak value and thus computing the Fourier transform only at necessary points in the Fourier domain. This search for the peak Fourier value occurs first at low (coarse) resolution over a reduced number of Fourier samples equally over the Fourier space to provide an estimated location of the peak Fourier value and then at a high resolution search for the peak Fourier value using the full number of Fourier samples limited to the region in the Fourier space vicinity of the estimated peak Fourier value.

DRAWINGS

DETAILED DESCRIPTION

Figure 1:
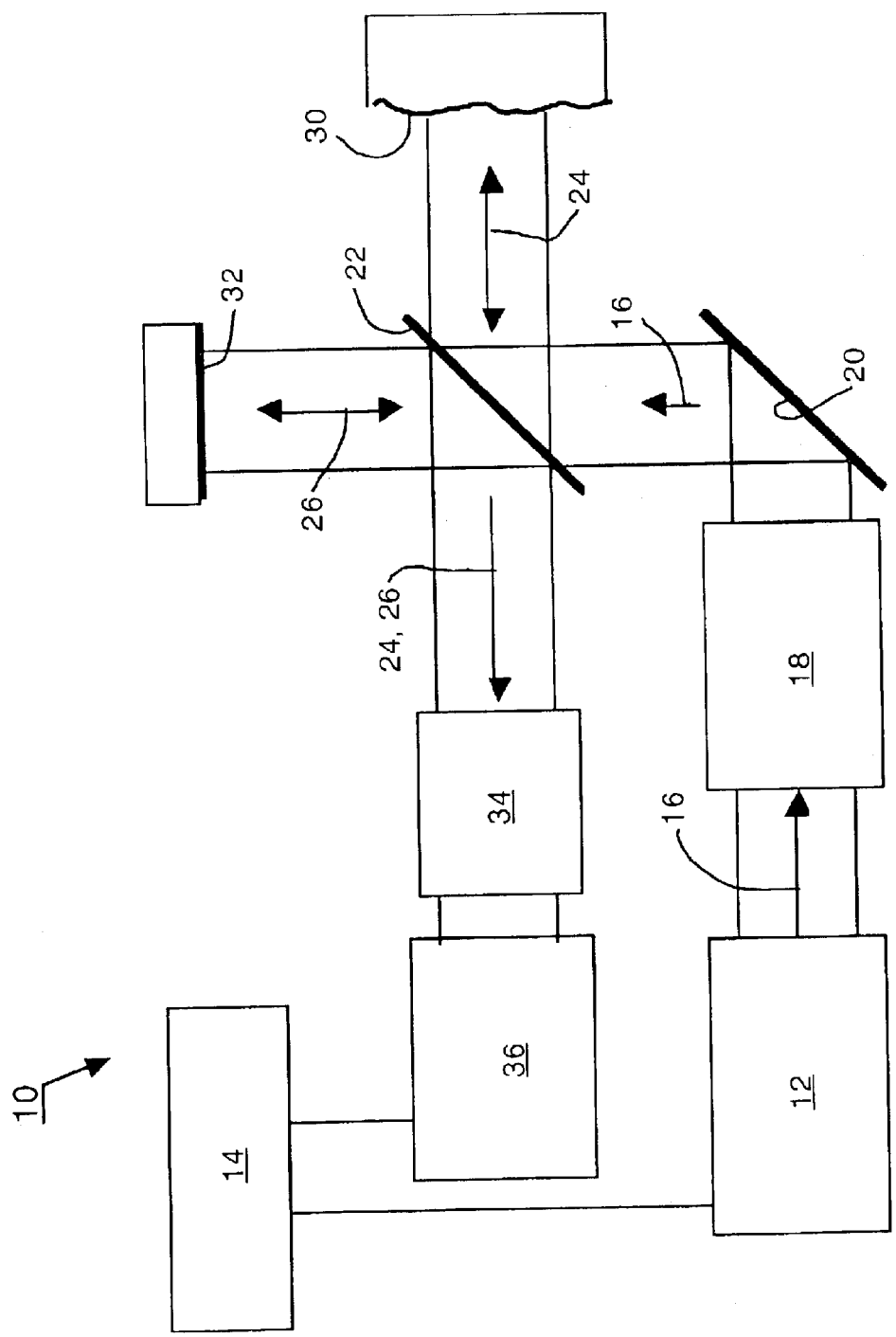
FIG. 1 is a block diagram of a frequency-scanning interferometer that can be operated in accordance with a computer program which is provided in accordance with the invention.

The frequency-scanning interferometer 10 shown in FIG. 1 is an example of a frequency-scanning interferometer that can be arranged and operated in accordance with the invention. The interferometer 10 can be operated by recording only intensity data of a succession of interference patterns and without phase-shifting the object or reference beams 24 or 26. This simplifies both hardware and software requirements of the interferometer 10, which would otherwise require means for systematically adjusting the relative path lengths of the object and reference beams and for interpreting the effects throughout the interference patterns.

The tunable laser 12 provides a radiation source, which is preferably a source of coherent radiation. For acquiring a succession of interference patterns produced by different frequencies of the radiation, the radiation source is preferably tunable through a range of different frequencies. A choice of nominal wavelength (e.g., 780 nm) can be made within the visible or invisible spectrum and can be selected on such bases as cost, resolution, and reflectance of the test object 52. An exemplary frequency-tunable laser preferred for the practice of this invention is disclosed in co-pending U.S. application Ser. No. 10/446,012, filed 27 May 2003, entitled TUNABLE LASER SYSTEM HAVING AN ADJUSTABLE EXTERNAL CAVITY, which is hereby incorporated by reference.

The detector array 36 provides a means within a data acquisition system for recording details of the interference patterns produced at the different frequencies. Preferably, the detector array 36 is composed of an array of individually addressable elements for separately measuring intensity at different points in the interference patterns. The computer 14 stores and processes the intensity data points acquired by the detector array 36.

The intensity values "I" recorded by elements of the detector array 36 can be written as the sum of two coherent components; one from the object beam 24 "$U_{obj}$" and one from the reference beam 26 "$U_{ref}$" as follows:

$$I = |(U_{obj} + U_{ref})|^2. \quad (1)$$

The recorded intensity "I" corresponds, for example, to the intensity measured by a pixel within the image produced by the object and reference beams 24 and 26. The object beam 24 "$U_{obj}$" can be written as:

$$U_{obj} = A_1 e^{i\left(\frac{2\pi}{\lambda} R_1\right)}, \quad (2)$$

and the reference beam 26 "$U_{ref}$" as:

$$U_{ref} = A_2 e^{i\left(\frac{2\pi}{\lambda} R_2\right)}, \quad (3)$$

where "$A_1$" and "$A_2$" are the amplitudes, "$\lambda$" is the wavelength, and "$R_1$" and "$R_2$" are the optical paths for the two beams 24 and 26.

Considering the path length difference as "$R=R_1-R_2$", the intensity "I" of an individual data point can be written as:

$$I = |A_1|^2 + |A_2|^2 + 2A_1 A_2 \cos\left(\frac{2\pi}{\lambda} R\right), \quad (4)$$

or using frequency notation:

$$I = |A_1|^2 + |A_2|^2 + 2A_1 A_2 \cos\left(\frac{2\pi}{c} R\nu\right), \quad (5)$$

where "c" is the speed of light and "v" is the beam frequency.

The intensity "I" described by the cosine term of Equation (5) depends upon both the path length difference "R" and the beam frequency "v". For example, the cosine term of the intensity "I" represents the cycling of the object and reference beams 24 and 26 through conditions of constructive and destructive interference as a function of the beam frequency "v". The periodicity of the intensity variation (preferentially referred to as the interference frequency) changes proportional to the path length difference "R". A determination of the interference frequency from the intensity data "I" gathered at a succession of "N" different beam frequencies "v" allows for the determination of the path length difference "R".

Equation (5) also shows that the intensity "I" has two basic terms: a bias term equal to "$|A_1|^2 + |A_2|^2$" and a cosine term. The sinusoidal intensity variation of interest arises from the cosine term. The bias term is an offset that can be easily removed by computing the mean "$\bar{I}$" of the intensity data and subtracting this mean from Equation (5). The mean "$\bar{I}$" of the intensity data can be computed as follows:

$$\bar{I} = \frac{1}{N} \sum_{n=1}^{N} I(n). \quad (6)$$

where "I(n)" denotes the intensity of corresponding data points of individual interference patterns totaling "N" different interference patterns. Each "n" represents the data collected in an interference pattern at a different beam frequency "v".

The detected intensity "I'(n)" of each data point within an interference pattern "n" with the bias term removed is as follows:

$$I'(n) = |A_1|^2 + |A_2|^2 + 2A_1A_2 \cos\left(\frac{2\pi}{c}Rv\right) - \bar{I}, \quad (7A)$$

or $$I'(n) = 2A_1A_2 \cos\left(\frac{2\pi}{c}Rv\right) \quad (7B)$$

As is apparent from Equation (7B), the frequency of the cosine term depends upon the frequency (or wavelength) of the measuring beam 16 and "R"—the optical path difference (OPD). Based on the incremental changes in beam frequency "v" provided by the tunable laser 12, a value of "R" can be fit to the function using Fourier transform methods. The procedure involves recording the interference patterns for a series of "N" beam frequencies. The data from each detector element is then Fourier transformed using known (or estimated) beam frequencies, and the locations of the peak interference frequencies of variation reveal the values of "R" for each detector element.

A discrete Fourier transform for assessing the frequency components of the function "I'(n)" can be written, as follows:

$$K'(m) = \sum_{n=1}^{N} I'(n) \exp[-i2\pi(n-1)(m-1)/M] \quad (8)$$

where "M" is the total number of frequency component samples distributed evenly throughout Fourier frequency space, "m" denotes one of the ordered frequency components ordered from 1 to "M" throughout the Fourier frequency space, and "K'(m)" measures how well each of the "m" ordered individual frequency component samples (also referred to as bins) matches the interference frequency of the recorded data point intensities "I'(n)" at corresponding areas of the "n" ordered interference patterns.

Figure 2:
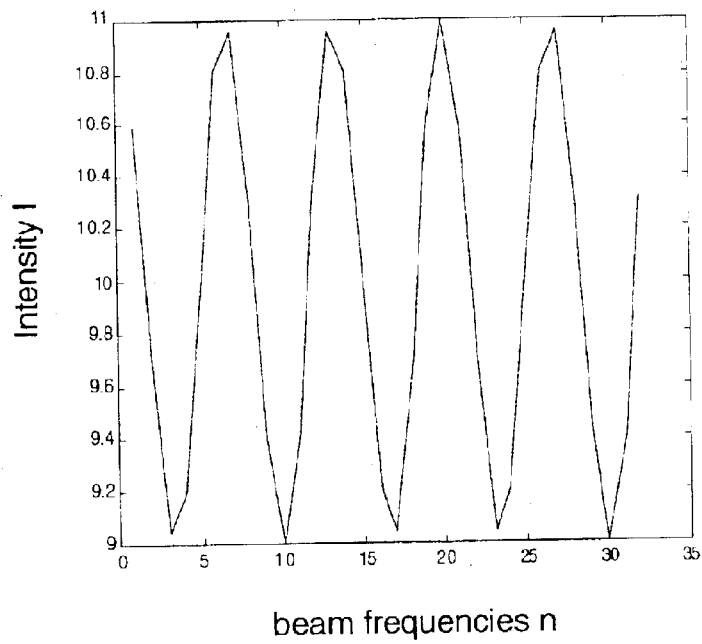
FIG. 2 is a plot of intensity data points gathered from a succession of interference patterns produced at a succession of different beam frequencies ordered from n=1 to n=N.

FIG. 2 shows the intensities "I(n)" of a typical data set of 32 (N=32) beam frequencies (ordered from n=1 to n=N) corresponding to a common area in each of the interference patterns. The plotted example is based on intensity values given as follows:

$$I(n)=10+\cos(3\pi n/10) \quad (9)$$

where the amplitude terms of Equation (5) are replaced by arbitrary values. The bias term "$|A_1|^2+|A_2|^2$" having a value of 10 is apparent in the ordinate offset of the data.

Figure 3:
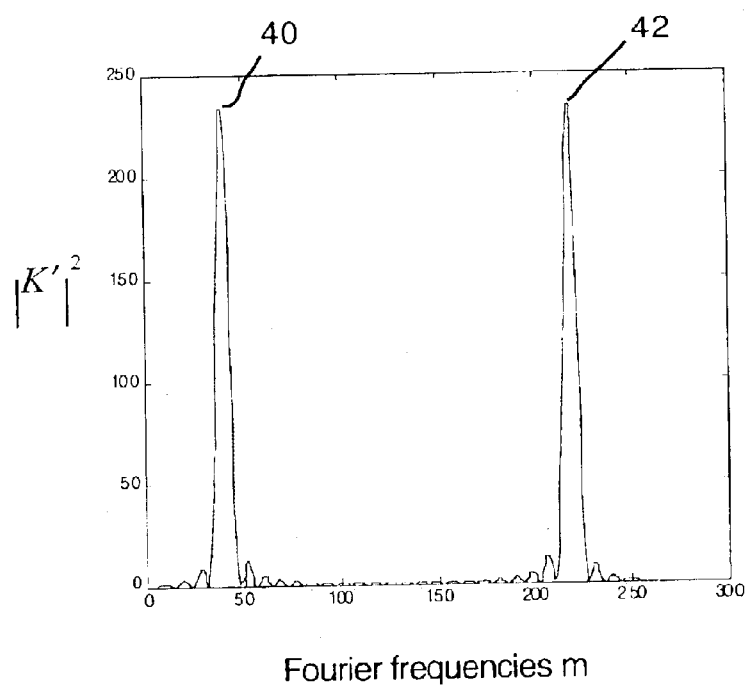
FIGS. 3 and 4 are plots of the values of the transform $|K'|^2$ over the full range of Fourier frequency space from m=1 to m=M for two different intensity data sets.

FIG. 3 shows a typical result of a discrete Fourier transformation of this intensity data "I(n)" fitted to Equation (7) with the mean value "$\bar{I}$" of the illumination intensity subtracted. Plotted are the relative amplitudes "$|K'|^2$" of the frequency components sampled within Fourier frequency space subdivided into 256 (M=256) equal subdivisions (ordered from m=1 to m=N) as follows:

$$|K'|^2=|FFT(I-\bar{I})|^2, \quad (10)$$

Two interference frequency peaks 40 and 42 result from the cosine function, corresponding to opposite signs of path length difference "R" between the object and reference beams 24 and 26. As path length differences "R" increase, one of the interference frequency peaks 40 or 42 devolves into the other 42 or 40; the exchange determining a range "$\Delta R_{AMB}$" at which the data can be unambiguously converted into path length variations.

The value of the range ambiguity interval "$\Delta R_{AMB}$" is given as:

$$\Delta R_{AMB} = c/2\Delta v_{INC}, \quad (11)$$

where "$\Delta V_{INC}$" is the size of the laser frequency increment between intensity data point samples.

The value of a range resolution "$\Delta R_{RES}$" corresponding to a single complete cycle of constructive and destructive interference within the entire range (or bandwidth) "$\Delta V_{TOTAL}$" of beam frequencies is given as:

$$\Delta R_{RES} = c/2\Delta v_{TOTAL} \quad (12)$$

Figure 4:
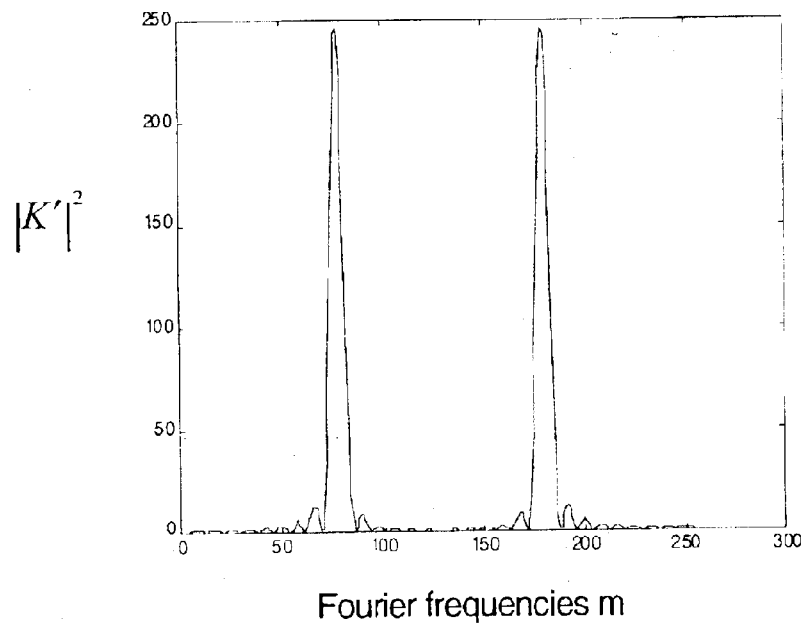

FIG. 4 shows an alternative result of the discrete Fourier transformation of intensity data "I(n)" in accordance with the following values:

$$I(n)=10+\cos(6\pi n/10) \quad (13)$$

New peaks 44 and 46 are shifted due to the different path length difference "R" between data sets. As path length distance "R" increases, one peak moves to the right, and one to the left, and at some point they cross over. The determination of which of the peaks 44 or 46 from FIG. 4 corresponds to the actual path length difference "R" between the object and reference beams 24 and 26 can be made by phase shifting in which the optical path length difference "R" between the object and reference beams 24 and 26 is deliberately altered in a systematic manner. Examples of phase-shifting methods to resolve the "two-peak" ambiguity and extend the measurement interval are disclosed in the previously referenced paper to J. C. Marron and Kurt W. Gleichman, as well as in U.S. Pat. Nos. 4,832,489; 5,777,742; 5,880,841; 5,907,404; and 5,926,277, which are also hereby incorporated herein.

Although phase shifting is routinely used for resolving interference ambiguities, the practice requires additional measurements, complicates measuring apparatus, and consumes processing time. However, by restricting the Fourier transform to one-half of the Fourier frequency space within which only one of the peaks 44 or 46 is found (e.g., the left half of the Fourier space), the ambiguity can be addressed. In accordance with an example of the improved computation (software or program) provided by the invention, the entirety of Fourier space is divided into 256 (M=256) Fourier frequency samples, but the peak is searched for only in the first 128 (i.e., m=1 to m=129) of the Fourier frequency samples.

Although one-half of Fourier frequency space is eliminated, the range of measurement need not be sacrificed because a comparable ambiguity range interval "$\Delta R_{AMB}$" can be maintained by increasing the number "N" of different frequency data points "I(n)". The data acquisition time is expected to be still less than that required to perform phase-shifting operations. The computations are much simpler and faster.

Considerably more computational time can be saved by first performing a coarse Fourier transform to obtain a first approximation of the location of the interference frequency peak 40 or 44 and then performing a fine Fourier transform limited to more finely spaced Fourier frequency samples in the vicinity of the first approximation. The coarse Fourier transform spaces the frequency samples more widely within the Fourier frequency space (e.g., m=1 to 129 by increments of 8). However, the spacing is preferably within the resolution interval "$\Delta R_{RES}$", which also corresponds to the widths of the interference frequency peaks 40 or 44, to be sure that some portion of the interference frequency peak 40 or 44 is identified. The total number $M_c$ of coarse Fourier frequency samples is preferably equal to N/2 samples.

Figure 5:
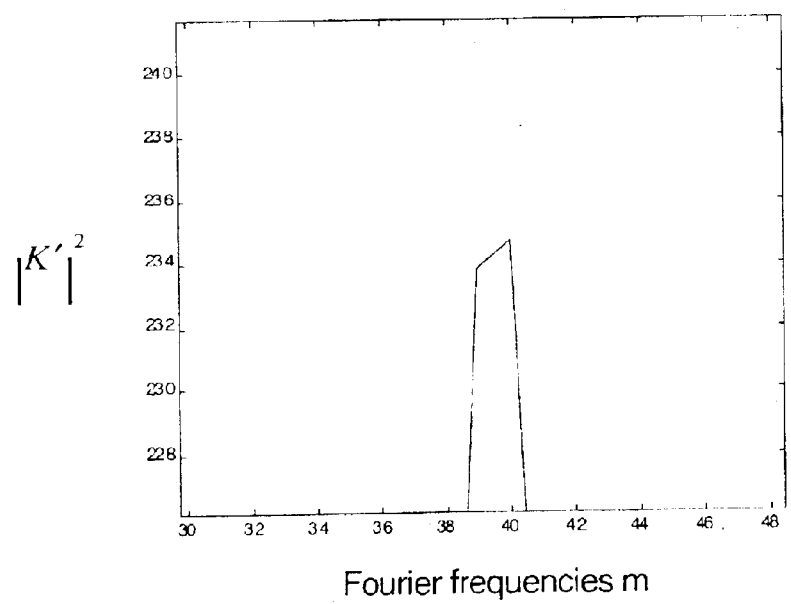
FIG. 5 is an enlargement of FIG. 3 showing one of the peak frequencies with greater accuracy.

FIG. 5 shows an expanded view of the left peak 40 from FIG. 3. Although the interference frequency peak 40 is located closest to a bin 40 out of 256, the interference frequency peak 40 would still be detectable within a bin 41 out of 256. Accordingly, the finer Fourier transform could be limited to a Fourier frequency range surrounding the bin 41 equal to the spacing between the Fourier frequency samples of the course approximation (e.g., m=37 to 45 by increments of 1). The total number $M_F$ of fine Fourier frequency samples is preferably equal to 2M/N samples.

Figure 6:
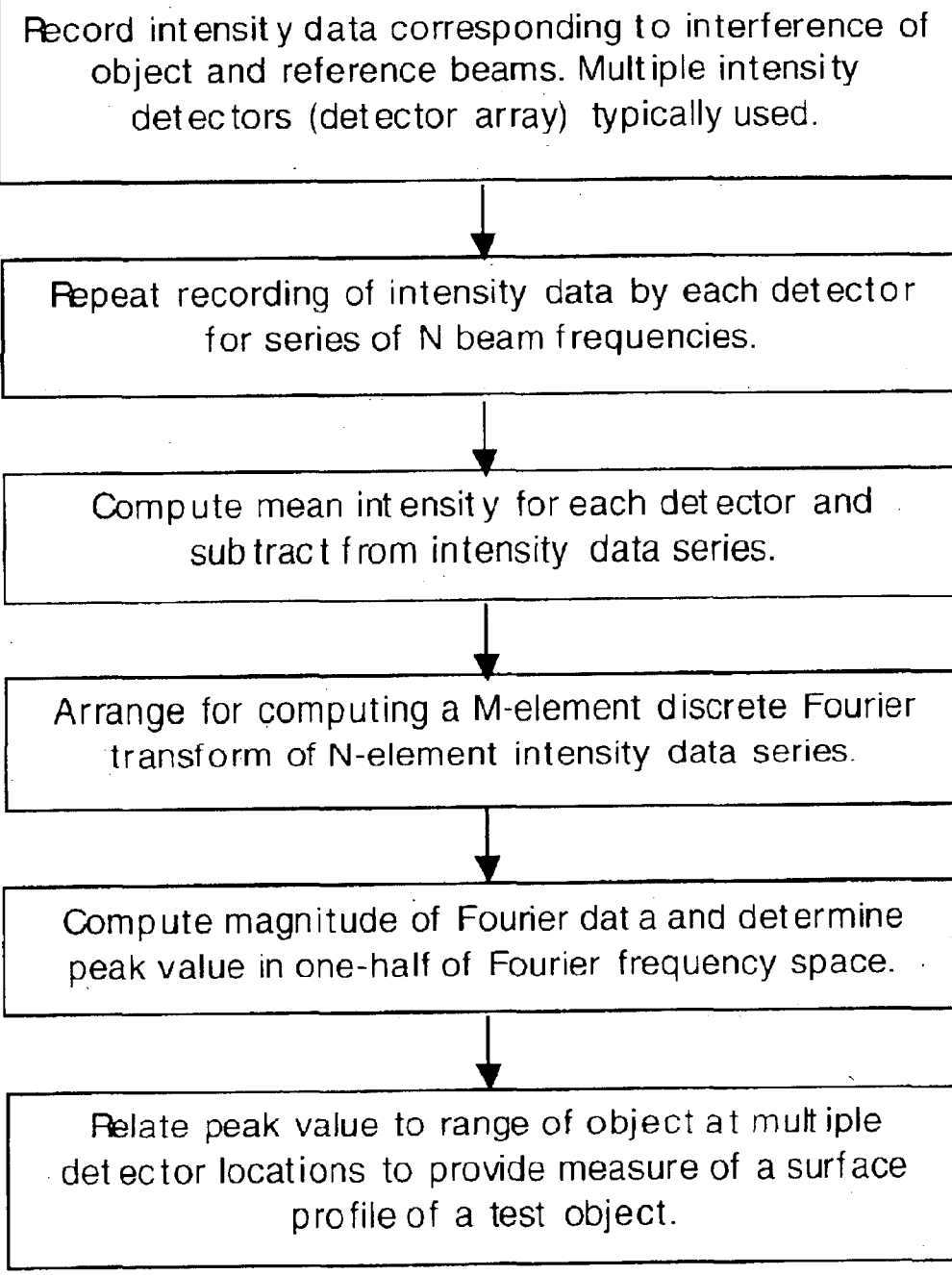
FIG. 6 is a flow chart illustrating the process performed by a computer program for saving computational time by deriving path length difference information from a limited portion of Fourier frequency space.

System parameters, such as the actual laser frequencies "v", can then be used to convert the digital value of bin 40 (i.e., m=40 of 256 bins) into an actual range or distance value. A computation process of the type provided for range determination is shown in FIG. 6.

The invention also provides for further increasing measurement accuracy by more finely locating the peak interference frequency within a Fourier frequency bin. The accuracy of range measurement in frequency-scanning interferometer systems heretofore proposed has been limited primarily by the number of Fourier samples, M. However, increased accuracy can be achieved by applying a curve-fitting algorithm can be used or the number of samples can be increased. Additionally, increased speed can be achieved by pre-computing the Fourier coefficients that are redundant for all detector locations.

The computational process embodied in the software or program provided by the invention, such as operating on the computer 50 of FIG. 1, is described with reference to FIG. 7. The program is stored in the memory of computer 50, such as ROM, RAM, disk, CDROM, or other typical memory storage medium. The term "computer" herein refers to a computer system having peripheral devices such as display, printer, mouse, keyboard, and the like, or other control computer of interferometric system, operating with a program in accordance with the present invention.

Figure 7:
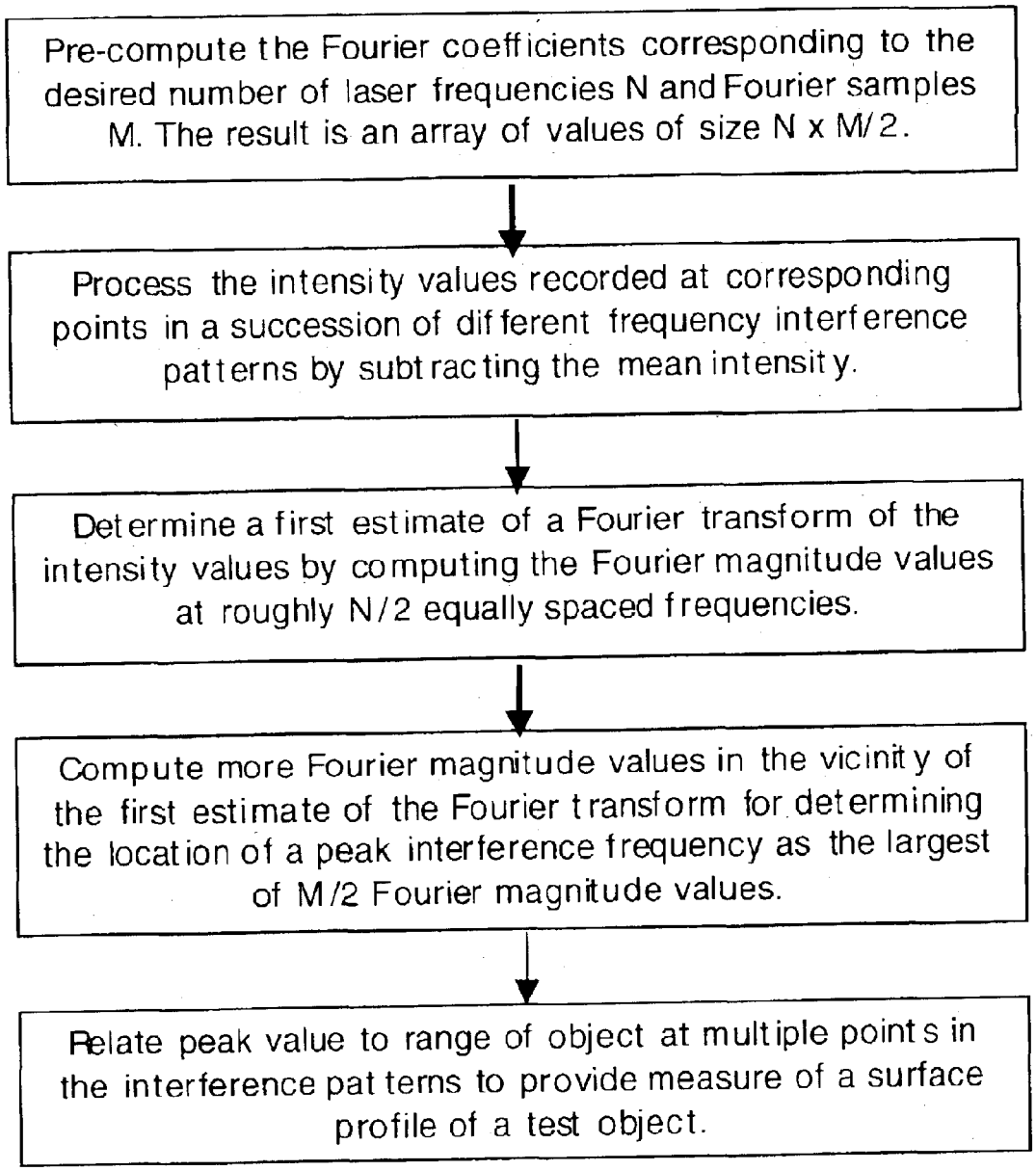
FIG. 7 is a flow chart showing the process performed by a computer program for saving computational time by performing Fourier transformations in stages.

The program preferably incorporates the following mathematics in conjunction with FIG. 7. From Equation (8), it can be shown that the Fourier coefficients of the interference signal are given by exponentials of the form:

$$\exp[-i2\pi(n-1)(m-1)/M], \tag{14}$$

where n=1, . . . N with "N" being the total number of intensity samples (or beam frequencies) for a common point within the interference patterns and m=1, . . . M/2 with "M" being the predetermined number of Fourier samples. The range of m is preferably limited to M/2 as only the one-half of the Fourier domain (frequency space) is examined because of redundancy. The value of "M" chosen should be large because it dictates accuracy. However, as M increases, the computation time required to search for the interference frequency peak 40 or 44 also increases. This array of coefficients of size N×M/2 is determined by the program at step 70 of FIG. 7 and can be stored in a file in memory of computer 50 so that re-computation is not required each time the program is run. The mean intensity values "Ī" are then subtracted, from the intensity values obtained at each detector point in the array 40 (step 72).

Next at step 74, the rough location (or a first approximation) of the interference frequency peak 40 or 44 is determined in the Fourier data by coarse sampling. Equations (11) and (12) show that the ratio of the Fourier peak width to the unambiguous range interval is given by N, where N is the number of beam frequencies. Thus, in order to determine the rough location of the Fourier peak, the Fourier data is sampled at at-least N equally spaced frequencies. Furthermore, since only one-half of the Fourier space is being considered, only the first N/2 coarse samples need be used. N/2 is the minimum number of coarse samples within the resolution desired. This number may be increased depending upon the level of performance desired but is still preferably equal to N or less to find a coarse approximation of the peak location. The Fourier transform values are computed in step 74. at the locations of the coarse samples by using the pre-computed Fourier coefficients as dictated by Equation (8). Once the Fourier magnitudes (or intensity values) of all the frequency samples are computed, the largest value is found in step 74 giving a coarse location for the highest Fourier value (i.e., a first approximation of the interference frequency of the data points).

Based on the initial estimate or first approximation of the peak location, the program proceeds with step 76 and refines the search to consider the Fourier locations near the initial estimate (the location of the peak coarse sample) until the largest of M/2 Fourier magnitude value is found. For example, the Fourier transform is preferably computed for all sample frequencies within an interval of Fourier frequency space that is equal to the spacing between adjacent coarse frequencies centered at the coarse frequency providing the initial estimate of the interference frequency peak location. The highest Fourier value within the more limited interval in the vicinity of the coarse estimate provides a fine estimate (or second approximation) of the location of the interference frequency peak 40 or 44. The number of Fourier samples "$M_F$" considered for the second approximation is preferably equal to 2M/N unless even finer stage approximations are made.

The range (or distance) value is determined at step 78 and corresponds to the maximum (peak) Fourier magnitude value encountered within the interval sampled at step 76 (i.e., the second approximation of the interference frequency peak location). For densities of N beam frequencies and M Fourier frequency samples, the computation is faster than that carried out heretofore. As shown in FIG. 6, the new computation requires the computation of N/2+2M/N Fourier samples. When compared to the originally reduced requirement of M/2 samples, it can be shown that for large M, N/4 times less computation is required. For example, with 32 beam frequencies, only ⅛ of the computation is required. This represents a significant reduction.

Higher accuracy with additional time savings with respect to the total number M of frequency samples is possible by using the second approximation of the peak location and the spacing between the second group of samples to define a third approximation of the location of the interference frequency peak 40 or 44. The third group of Fourier frequency samples is preferably centered at the second approximation of the peak frequency and considers more finely spaced samples further dividing a range between adjacent samples of the second group. This further procedure implies a larger value of M for making more accurate measurements, where for consistency, the highest approximation considers divisions of M by unit values.

The number of Fourier frequency samples at any one of the stage approximations can be set to optimize the application of a fast Fourier transform (FFT). For example, the number Fourier samples in each such stage (e.g., $M_c$ or $M_F$) can be set approximately equal to the number of data samples "N".

An alternative process to search for the peak at step 76, while minimizing computation, takes into account that in the vicinity of the estimated peak Fourier value, the shape of the transform curve is approximately parabolic. It then follows that the derivative, or difference between adjacent Fourier values, is approximately linear. Furthermore, the interference frequency peak 40 or 44 corresponds to the location where the derivative has zero value. Thus, interpolation techniques can be used to find the zero value location of the derivative and thus the more exact location of the peak 40 or 44.

Based on the computer software program, which is carried out on a computer, range or distance measures based on the calculation of path length differences between object and reference beams can be used to generate a surface profile (i.e., topographical information) of a test, object. The software is operative upon interferometric intensity data gathered at a succession of different beam frequencies for rapidly and accurately deriving the range measurements by comparison to Fourier frequency samples. Systematic searches for the peak value of the Fourier transform are computed only at the necessary points in the Fourier domain, which are in the vicinity of an estimated peak value. Additional accuracy can be obtained by locating the peak between adjacent Fourier frequency samples values where the derivative of the frequency transform has zero value.

Although the invention has been referenced with respect to a particular frequency-scanning interferometer, the invention is applicable to a wide range of other frequency-scanning interferometer configurations. For example, particular benefits of the invention are evident for common-path (Fizeau) type interferometers such as disclosed in my co-pending U.S. application filed on 19 June 2003 entitled COMMON-PATH FREQUENCY-SCANNING INTERFEROMETER, which is hereby incorporated by reference. Other variations and modifications in the interferometer system and in the computer program and process described herein will undoubtedly suggest themselves to those skilled in the art within the spirit and scope of the invention.

I claim:

1. A multi-stage process for interpreting interferometric fluctuations of frequency-scanning interferometers comprising the steps of:
   producing a succession of N interference patterns between object and reference beams at N different beam frequencies within a range of beam frequencies;
   recording interferometric data for a corresponding area appearing in each of the N interference patterns, the interferometric data for the corresponding area cycling through conditions of constructive and destructive interference with variation in the beam frequencies;
   performing a first approximation of an interference frequency corresponding to a number of interference cycles the interferometric data for the corresponding area undergoes throughout the range of beam frequencies;
   determining bounds of the first approximation;
   performing a second approximation of the interference frequency within the bounds of the first approximation of the interference frequency; and
   converting the second or higher approximation of the interference frequency into a measure corresponding to a path length difference between portions of the object and reference beams that interfere within the corresponding area of the interference patterns.

2. The method of claim 1 in which the first approximation approximates the interference frequency from among the number N or less choices of interference frequency.

3. The method of claim 2 in which the first approximation approximates the interference frequency from among approximately N/2 choices of interference frequency.

4. The method of claim 1 in which the choices of interference frequency within the first approximation are distinguished by whole cycles of constructive and destructive interference within the range of beam frequencies, and the choices of interference frequency within the second approximation are distinguished by less than whole cycles of constructive and destructive interference within the range of beam frequencies.

5. The method of claim 1 in which the first approximation approximates the interference frequency from among a first range of interference frequencies separated by a first increment, the second approximation approximates the interference frequency from among a second range of interference frequencies separated by a second increment, and the second range of frequencies being approximately equal to the first increment separating interference frequencies within the first range.

6. The method of claim 1 in which the first approximation approximates the interference frequency from among $M_1$ choices of interference frequency and the second approximation approximates the interference frequency from among $M_2$ choices of interference frequency, and the second approximation being substantially equivalent in accuracy to single approximation that approximates the interference frequency from among the product of $M_1$ times $M_2$ choices of interference frequency.

7. The method of claim 1 in which for at least one of the first and second approximations, the number N of beam frequencies is substantially equal to a number M of interference frequency choices.

8. The method of claim 1 in which the range of beam frequencies determines a lower bound of effectively measurable path length differences between the object and reference beams, and an average increment between adjacent beam frequencies determines a range of unambiguous path length differences.

9. The method of claim 8 in which a lower bound of path length differences between object and reference beams within the unambiguous range is associated with an interference frequency of unity or less cycles of constructive and destructive interference within the range of beam frequencies.

10. The method of claim 9 in which an upper bound of path length differences within the unambiguous range is associated with an interference frequency of N/2 cycles of constructive and destructive interference within the range of beam frequencies.

11. The method of claim 1 in which (a) the step of recording interferometric data includes recording intensity data for a plurality of corresponding areas appearing in each of the N interference patterns, the intensity data for each of the corresponding areas cycling through conditions of constructive and destructive interference with the variation in the beam frequencies, (b) the step of performing the first approximation includes performing first approximations of interference frequencies corresponding to the number of interference cycles the intensity data for the corresponding areas undergo throughout the range of beam frequencies, and (c) the step of determining bounds includes determining bounds of the first approximations, and (d) the step of performing the second approximation includes performing second approximations of the interference frequencies within the individual bounds of the first approximations of the interference frequency.

12. The method of claim 11 in which the step of converting the second or higher approximation includes converting the second or a higher approximations of the interference frequencies into measures corresponding to a path length difference between different portions of the object and reference beams that interfere within the corresponding areas of the interference patterns.

13. The method of claim 1 including an additional step of performing a third approximation of the interference frequency within the bounds of the second approximation of the interference frequency, and the step of converting the second or higher approximation includes converting the third or a higher approximation of the interference frequency into a measure corresponding to a path length difference between portions of the object and reference beams that interfere within the corresponding area of the interference patterns.

14. The method of claim 1 in which the step of performing the second or a higher approximation of the interference frequency includes steps of identifying two close approximations of the interference frequency and interpolating a closer approximation of the interference frequency from the two close approximations of the interference frequency.

15. The method of claim 14 in which the step of interpolating a closer approximation includes identifying the closer approximation at a location where a first derivative of an implied function has a zero value.

16. The method of claim 1 including additional steps of calculating a mean intensity of the interferometric data for the corresponding area appearing in each of the N interference patterns, and subtracting the calculated mean from the interferometric data prior to performing the first approximation.

17. A system for deriving length information from interferometric data collected over a range of different frequencies comprising:
a frequency-scanning interferometer for producing a series of interference patterns between object and reference beams over the range of different frequencies;
a common location within the interference patterns that discretely cycles over the range of different frequencies through conditions of constructive and destructive interference at a rate corresponding to an interference frequency;
a data acquisition system for acquiring data samples from the common location within the series of interference patterns;
a processor arranged for (a) evaluating a first set of samples of the interference frequency against the data samples to obtain a first approximation of the interference frequency that matches the cycle rate of the data samples and (b) evaluating a second set of samples of the interference frequency in the vicinity of the first approximation of the interference frequency against the data samples to better approximate the interference frequency that matches the cycle rate of the data samples; and
the processor also being arranged for relating the better approximated interference frequency to length differences between the object and reference beams.

18. The system of claim 17 in which the first set of samples of the interference frequency are frequency components of a Fourier transform that are compared to determine a peak interference frequency component.

19. The system of claim 18 in which the frequency components of the first set of interference frequency samples are spaced apart at a first increment, and the frequency components of the second set of interference frequency samples are spaced apart at a second increment that is finer than the first increment.

20. The system of claim 19 in which a range of the frequency components of the second set of interference frequency samples is approximately equal to the first increment at which the first set of interference frequency samples are spaced apart.

21. The system of claim 19 in which the first increment is no larger than a unit interference frequency.

22. The system of claim 21 in which the first increment is equal to one-half of a unit interference frequency.

23. The system of claim 19 in which the processor correlates at least one of the sets of the interference frequency samples with the data samples by a Fourier transform that identifies the interference frequency sample of the set that best matches the cycle rate of the data samples.

24. The system of claim 23 in which the processor correlates both sets of the interference frequency,samples with the data samples by a Fourier transform that identifies the interference frequency sample of each set that best matches the cycle rate of the data samples.

25. The system of claim 17 in which (a) the common location is one of a plurality of common locations in the interference patterns, (b) the data acquisition system acquires individual groups of data samples from the plurality of common locations within the series of interference patterns, and (c) the processor is arranged for (a) separately evaluating the first set of samples of the interference frequency against the individual groups of data samples to obtain first approximations of the interference frequencies that match the cycle, rates of the individual groups of data samples and (b) separately evaluating second sets of samples of the interference frequency in the vicinity of the first approximations of the interference frequency against the individual groups of data samples to better approximate the interference frequencies that match the cycle rates of the individual groups of data samples.

26. The system of claim 25 in which the same first set of samples of the interference frequency is evaluated against the groups of data samples and different second sets of samples of the interference frequency are evaluated against the groups of data samples in accordance with differences between the first approximations of the interference frequency associated with the different groups of data samples.

27. The system of claim 25 in which the processor is also arranged for relating the better approximated interference frequencies to range information between the object and reference beams for deriving topographical information about a test surface.

28. The system of claim 17 in which the processor is arranged for evaluating a third set of samples of the interference frequency in the vicinity of the second approximation of the interference frequency against the data samples to even better approximate the interference frequency that matches the cycle rate of the data samples.

29. A method of reducing calculations of a frequency transform for converting interferometric data into length differences between object and reference beams comprising steps of:
acquiring the interferometric data from a plurality of interference patterns produced by the object and reference beams and distinguished by frequencies of the beams;

extracting a succession of N interference data points from corresponding portions of the interference patterns, the succession of data points cycling between conditions of constructive and destructive interference at an interference frequency related to the path length differences between the test and reference beams;

constructing a Fourier transform of the type used for evaluating frequency contributions of M Fourier samples distributed throughout Fourier frequency space to the N data points collected from the interference patterns;

limiting the Fourier transform to the evaluation of less than M Fourier frequency samples similarly distributed throughout a limited portion of the Fourier frequency space; and identifying from among the less than M Fourier frequency samples an approximation of the interference frequency as a measure of the path length difference between the test and reference beams.

30. The method of claim 29 in which the step of limiting the Fourier transform includes limiting the Fourier transform to the evaluation of no more than M/2 Fourier frequency samples similarly distributed throughout the no more than one-half of the Fourier frequency space.

31. The method of claim 30 in which the step of identifying includes identifying the approximation of the interference frequency from among the no more than M/2 Fourier frequency samples.

32. The method of claim 29 in which the step of identifying includes identifying a first approximation of the interference frequency from among the Fourier frequency samples limited to no more than N Fourier frequency samples.

33. The method of claim 32 in which the step of identifying includes identifying a second approximation of the interference frequency from among new Fourier samples that further divide the Fourier frequency space in the vicinity of the first approximation of the interference frequency.

34. The method of claim 33 in which the Fourier frequency space considered for the second approximation is approximately equal to the Fourier frequency space between the Fourier frequency samples of the first approximation.

35. The method of claim 29 including additional steps of recording intensity information for each of the N interference data points, calculating a mean intensity of the data points, and subtracting the calculated mean from the data points.

* * * * *

UNITED STATES PATENT AND TRADEMARK OFFICE
CERTIFICATE OF CORRECTION

PATENT NO.   : 6,741,361 B2
DATED        : May 25, 2004
INVENTOR(S)  : Marron, Joseph C.

It is certified that error appears in the above-identified patent and that said Letters Patent is hereby corrected as shown below:

Column 7,
Equation (1), "$I=|(U_{obj}+U_{ref})^2$" should read -- $I=|(U_{obj}+U_{ref})|^2$ --.

Column 9,
Line 48, ""$|A_1|^2+|A_2|^2|$"" should read -- "$|A_1|^2 +|A_2|^2$" --.

Signed and Sealed this

Sixteenth Day of November, 2004

JON W. DUDAS
*Director of the United States Patent and Trademark Office*